(12) United States Patent
Mauran et al.

(10) Patent No.: US 8,181,908 B2
(45) Date of Patent: May 22, 2012

(54) CONTROL SURFACE FAILSAFE DROP LINK

(75) Inventors: Guy Mauran, Bristol (GB); Paul Blades, Bristol (GB); Richard John Henry Burness, Bristol (GB)

(73) Assignee: Airbus Operations Limited, Bristol (GB)

( * ) Notice: Subject to any disclaimer, the term of this patent is extended or adjusted under 35 U.S.C. 154(b) by 671 days.

(21) Appl. No.: 12/278,586

(22) PCT Filed: Feb. 21, 2007

(86) PCT No.: PCT/GB2007/000615
§ 371 (c)(1),
(2), (4) Date: Aug. 7, 2008

(87) PCT Pub. No.: WO2007/096624
PCT Pub. Date: Aug. 30, 2007

(65) Prior Publication Data
US 2010/0032520 A1 Feb. 11, 2010

(30) Foreign Application Priority Data
Feb. 22, 2006 (GB) .................................. 0603539.8

(51) Int. Cl.
*B64C 3/38* (2006.01)
*B64C 5/10* (2006.01)
*B64C 9/00* (2006.01)
*B64C 13/00* (2006.01)
(52) U.S. Cl. ...................................... 244/99.4; 244/99.3
(58) Field of Classification Search .................... 244/54, 244/99.2, 99.3, 99.4, 90 R, 90 A
See application file for complete search history.

(56) References Cited

U.S. PATENT DOCUMENTS

| 3,140,066 | A | | 7/1964 | Sutton et al. |
| 5,275,357 | A | * | 1/1994 | Seelen et al. ..................... 244/54 |
| 5,303,880 | A | | 4/1994 | Cencula et al. |
| 5,649,417 | A | | 7/1997 | Hey |
| 6,988,692 | B2 | * | 1/2006 | Pasquer et al. .................. 244/54 |
| 7,108,224 | B2 | * | 9/2006 | Pasquer et al. .................. 244/54 |
| 7,165,743 | B2 | * | 1/2007 | Pasquer et al. .................. 244/54 |
| 7,325,770 | B2 | * | 2/2008 | Chevalier et al. ............... 244/54 |
| 2002/0100840 | A1 | | 8/2002 | Billinger et al. |
| 2005/0269445 | A1 | * | 12/2005 | Chevalier et al. ............... 244/54 |

FOREIGN PATENT DOCUMENTS

| GB | 2200330 A | 8/1988 |
| RU | 2167788 C2 | 4/1998 |

OTHER PUBLICATIONS

International Search Report and Written Opinion for PCT/GB2007/000615 mailed Aug. 1, 2007.
UK Search Report for GB0603539.8 dated Aug. 24, 2006.

* cited by examiner

*Primary Examiner* — Tien Dinh
*Assistant Examiner* — Michael A Fabula
(74) *Attorney, Agent, or Firm* — Lowe, Hauptman, Ham & Berner, LLP (57) ABSTRACT

An aircraft control surface failsafe hinge configuration is disclosed. The arrangement comprises a drop link configuration which is adapted to attach a control surface to an aircraft structure where the drop link additionally incorporates a failsafe hinge means which provides a backup hinge connection between the control surface and the aircraft structure to which it is attached. The improved failsafe hinge construction may be applied to any aircraft control surface such as an aileron, elevator, vertical tail plane and the like.

12 Claims, 8 Drawing Sheets

CONTROL SURFACE FAILSAFE DROP LINK

RELATED APPLICATIONS

The present application is based on International Application Number PCT/GB2007/000615 filed Feb. 21, 2007, and claims priority from British Application Number 0603539.8 filed Feb. 22, 2006, the disclosures of which are hereby incorporated by reference herein in their entirety.

TECHNICAL FIELD

The present invention relates to methods and apparatus for connecting control surfaces to aircraft structures. More particularly, although not exclusively, the invention relates to methods and apparatus for connecting spoilers to wing structures. The invention further relates to failsafe systems for control surface connection arrangements between, for example, spoilers and wing structures.

BACKGROUND ART

Conventionally, on large transport aircraft aerodynamic control surfaces, such as spoilers, are attached to a corresponding aircraft structure by means of primary hinges, failsafe hinges and drop links. Specific construction techniques have been developed for the installation of such control surfaces, specifically to provide the desired operating and failsafe characteristics of the aircraft component.

The following description is specifically provided in the context of providing failsafe functionality to spoiler installations. However, it is to be understood that this example of the invention has been chosen as it provides particular descriptive clarity. The present invention may be equally applied, with appropriate modification, to control surfaces in general such as ailerons, elevator and vertical tail plane.

Figure 1:
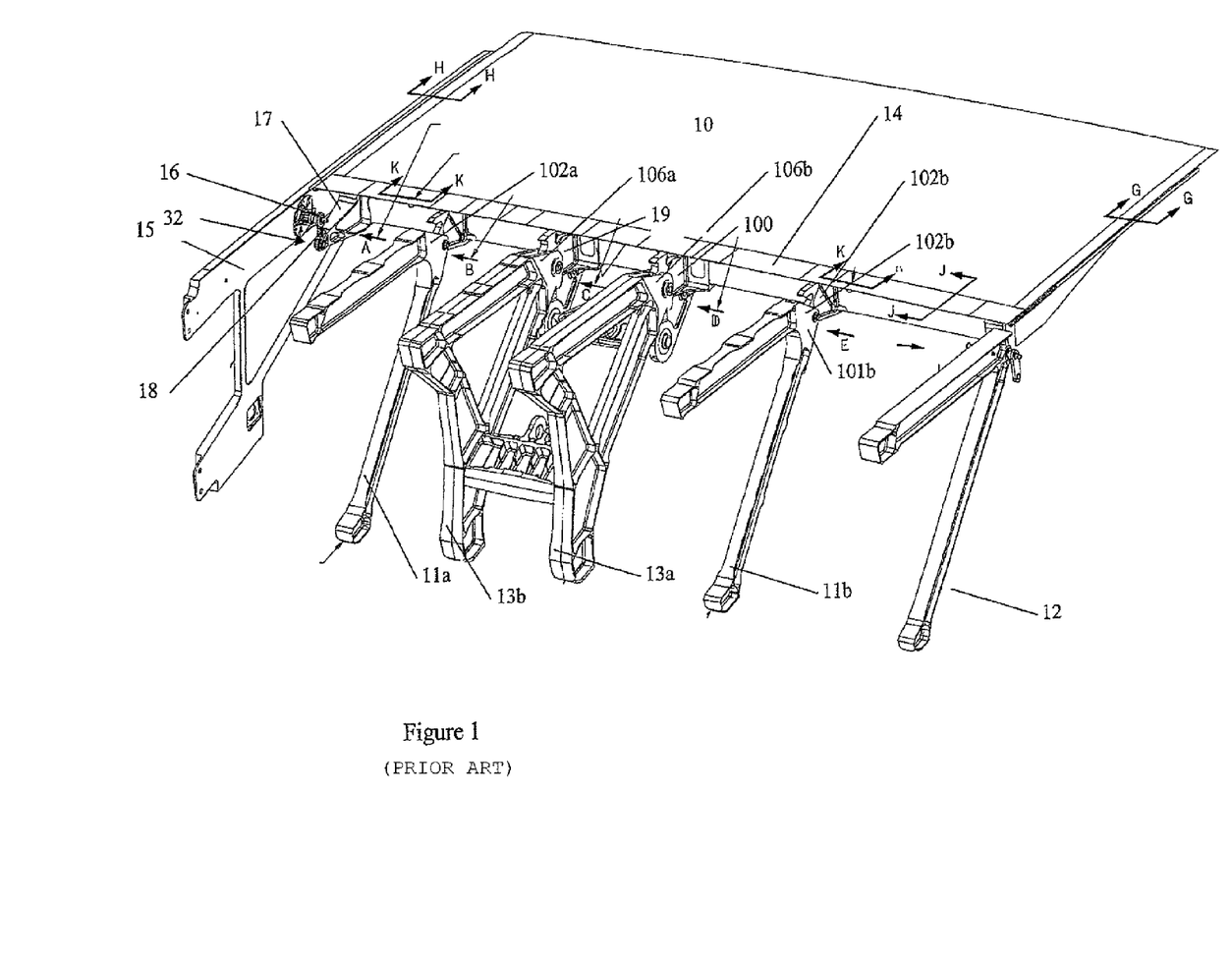
FIG. 1: illustrates a prior art spoiler/wing hinge arrangement.

An example of a spoiler construction is shown in FIG. 1 which illustrates a spoiler installation for the Airbus A380 civil passenger aircraft. The remainder of the wing structure is omitted for clarity. According to the illustrated example, primary hinges C and D are located on the trailing edge of corresponding spoiler ribs 13a and 13b. The spoiler ribs are mounted on the trailing edge of the wing box (not shown).

Figure 2:
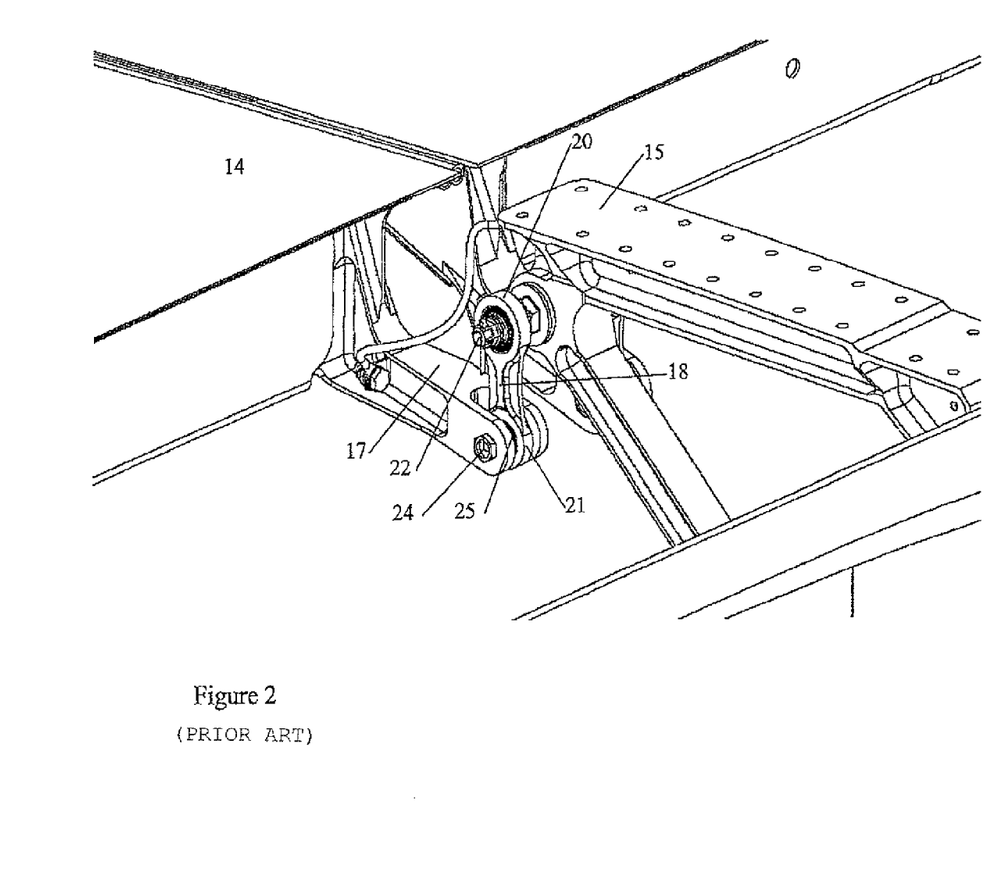
FIG. 2: illustrates detail of the drop link shown in FIG. 1.

Spoiler 10 is mounted on hinges C and D by means of the hinge construction indicated generally by the numerals 19 and 100 respectively. These primary hinges are the main load-bearing components that support the spoiler 10 and react to the aerodynamic forces created when the spoilers are extended. Drop links generally indicated by the numeral 32, are located at either end of the spoiler 10 where the spoiler engages with the wing trailing edge structure. FIG. 2 illustrates details of a conventional droplink at an intermediate position where the spoiler is attached to a spoiler rib 15. Referring to FIG. 2, the drop link 18 is an elongate member pivotally connected at each end 20 and 21 to the wing structure 15 and to the leading edge 14 of the spoiler 10 respectively.

Drop links serve to transmit load between the wing structure and the spoiler, whilst at the same time permitting the spoiler to conform to the shape of the wing as it bends under a range of flight loads. The ability of the droplink to rotate in a span wise direction significantly reduces the loads that would be introduced into the spoiler, hinge and wing structure if the spoiler were forced to bend in its plane of maximum stiffness when deployed, as it would be if the hinge were a simple bearing and pin arrangement as used for the main hinges.

Referring to the conventional drop link shown in detail in FIG. 2, the lower end 21 of the drop link 18 is connected by means of a spherical bearing 25 to a spoiler clevis 17. At its upper end 20, the drop link 18 is connected to the wing-box trailing edge rib structure 15, by means of a spherical bearing (not indicated). The spherical bearings allow the spoiler to pivot around the hinge axis of the spigot pin 22 as the spoiler 10 is extended and retracted, while simultaneously constraining spoiler movement in the plane defined by this rotation. Thus, with reference to FIG. 1, as the wing structure 15 moves under the action of wing flex, the drop link transmits this movement into the spoiler 10 by means of the drop link arm length. As noted above, the spoiler hinge rotation axis coincides with the lengthwise axis of drop link spigot pin 22, thus allowing simultaneous extension/retraction and bending of the spoiler depending on how far the spoiler is extended. For example, if the spoiler is fully extended, the bending force will be nearly zero as the vertical component of the drop link arm length resolved in the span wise wing direction would be small. This avoids stressing the extended spoiler due to wing flex.

One of the sources of structural failure in aircraft control surfaces is failure of their primary hinge assemblies. With reference to the present example, this corresponds to failure of the primary hinge subassembly C and D in FIG. 1. This may occur either by way of failure of the primary hinge pin 106a and/or 106b or by failure of the hinge subassembly as a whole.

Figure 6:
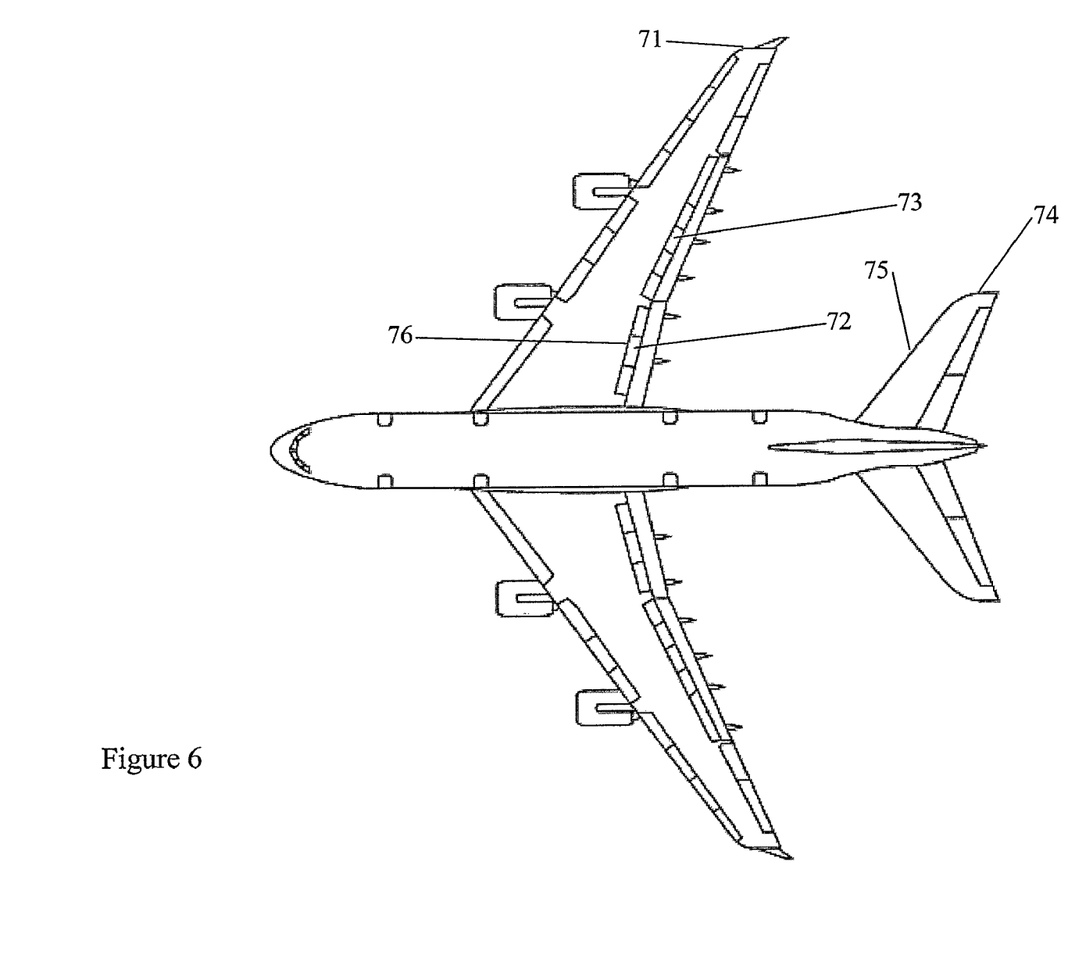
FIG. 6: illustrates a plan view of an aircraft showing the general layout of the spoiler control surfaces in accordance with embodiments of the invention.

Referring to FIG. 6, the location of the inboard spoilers on the wing 71 is indicated by the numeral 72 and the outboard spoilers by the numeral 73. The spoiler installation in this example includes three individual inboard spoilers 72 attached by means of primary hinges and drop links.

If a primary hinge of an inboard spoiler 72 fails under flight loads, there is a risk that the spoiler can detach and, moving in the direction indicated by the letter "A", strike the horizontal stabilizer 74. A particularly vulnerable part of the horizontal stabilizer 74 is the leading edge 75. The impact of the spoiler 72 traveling at flight speeds can cause failure of the horizontal stabilizer 74 either by degrading its aerodynamic function or by complete catastrophic failure of the horizontal stabilizer. In either case, this damage can render the aircraft uncontrollable. Although the probability of such structural failure in a spoiler is very small, it is nevertheless finite and, over the expected lifetime of an aircraft in service, is at a level, which, without a failsafe system, is unacceptable in civil aircraft production.

To reduce this failure probability, spoiler failsafe hinges are used. In the prior art example shown in FIG. 1, failsafe hinges B and E are located at intermediate positions between the primary hinges C and D.

Failsafe hinges 102a and 102b are mounted on the aft portions of correspondingly located spoiler ribs 11a and 11b. Spoiler ribs are wing ribs extending from the trailing edge of the wing box (35 in FIG. 3) to which are mounted the spoiler subassembly 10 including the hydraulic actuators, mounts and related hardware (not shown in FIG. 1).

Figure 7:
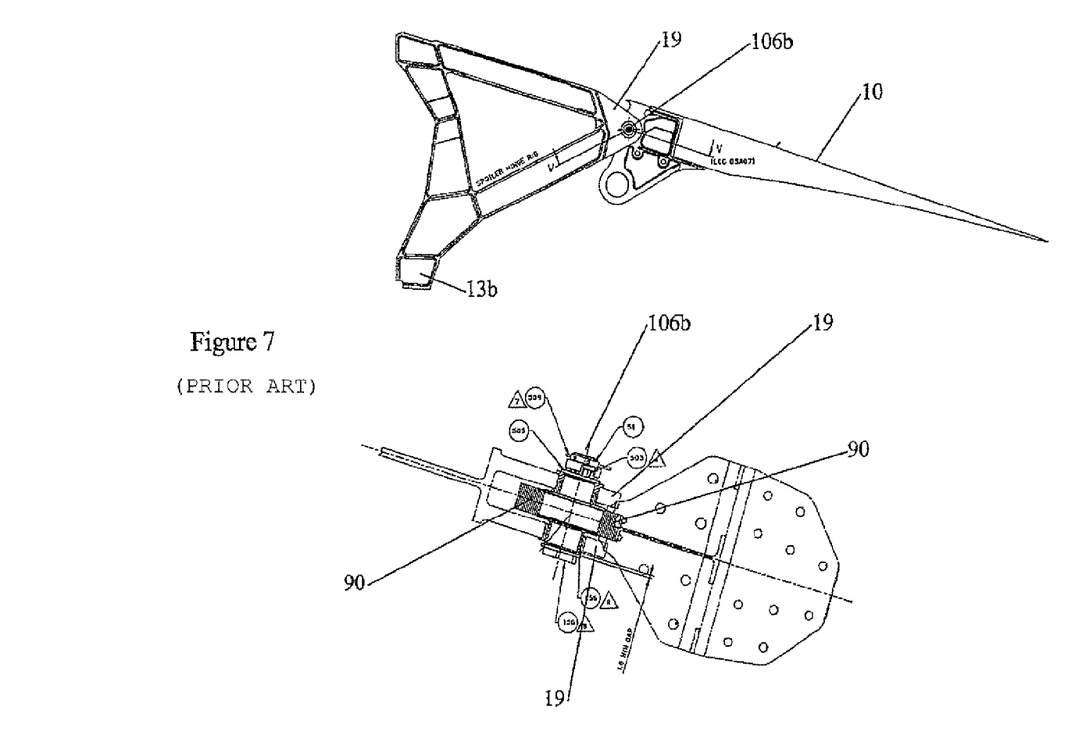
FIG. 7: illustrates detail of a prior art spoiler primary hinge.

Failsafe hinges 102a and 102b are essentially similar to the primary hinges 106a and 106b except that the failsafe hinge apertures have a diameter greater than the failsafe clevis pins. This can be seen in FIG. 8, which includes a cross-section view through a failsafe hinge. A conventional spoiler failsafe hinge part includes an apertured tab 81, which engages with spoiler clevis 101a and 101b by means of a clevis pin 80. The size of the aperture in the spoiler tab 81 is however significantly larger than the external diameter of the failsafe spoiler clevis pin 80. This can be seen by the presence of the annular void 82 (unshaded) in FIG. 1. Thus, during normal flight, no loads are applied to the failsafe clevis pin assembly. In contrast, detail of a primary spoiler hinge is shown in FIG. 7. Here a spoiler hinge includes a spoiler clevis 19, spoiler clevis pin 106*b* and a hinge bush 90.

Figure 8:
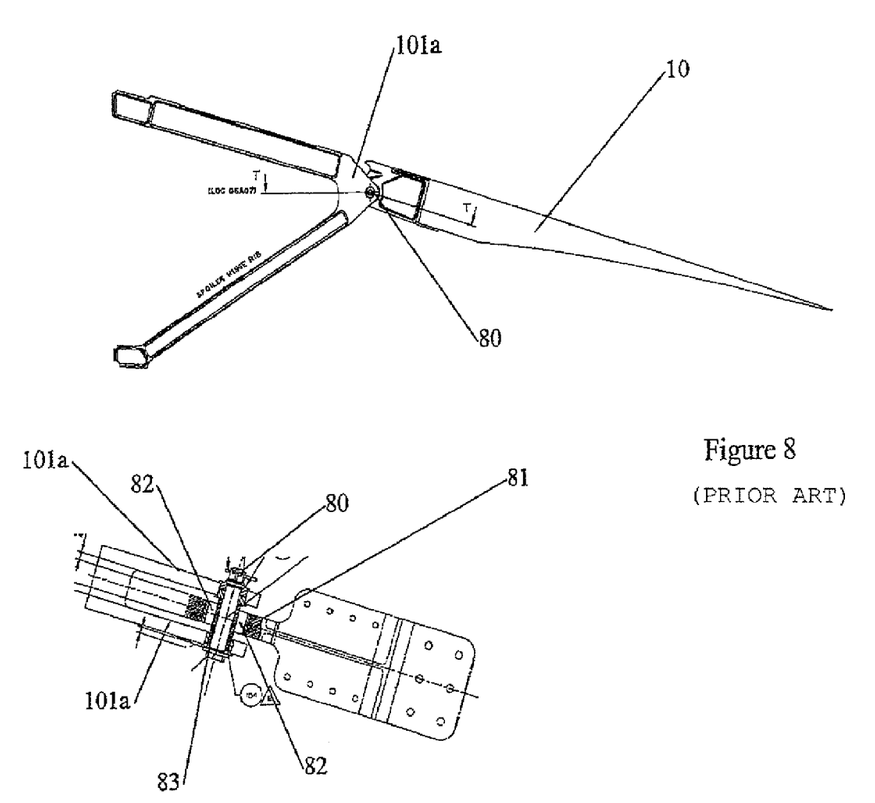
FIG. 8: illustrates detail of a prior art spoiler failsafe hinge.

If a primary hinge fails, for example, by the main hinge pin 106*b* or the clevis 19 failing under flight loads, the spoiler 10 displaces from its operational position. This movement continues until the failsafe hinge clevis pin 80 (see FIG. 8) contacts the inner part of the failsafe clevis 101*a*. In FIG. 8 this would be manifested by the hinge failsafe pin 80 moving rightwards until it bears against the inner surface of the failsafe spoiler clevis aperture 82. The spoiler 10 is thereby prevented from detaching completely from the wing structure. The overall operation of the spoiler is preserved in that the spoiler failsafe hinge allows spoiler movement through its normal range of extension and retraction without interfering with other parts of the aircraft structure or other control surfaces.

Under such conditions, although the handling of the aircraft may be affected, the probability of complete structural failure and detachment of the spoiler and the subsequent risk of horizontal stabilizer damage is reduced to an acceptable level.

One disadvantage with presently accepted spoiler failsafe hinge constructions, such as that shown in FIG. 1, and other control surface installations, is that the failsafe hinge ribs and hinges need to be present on the aircraft and reinforced appropriately. This incurs a weight penalty in the overall wing construction that is even more onerous given that it is highly unlikely that the failsafe hinge system will ever be used during the typical service life of an aircraft. However, it is a certification requirement for such a backup subassembly to be present on the wing.

The present invention attempts to address this weight penalty issue and provide an alternative control surface connection failsafe configuration.

DISCLOSURE OF THE INVENTION

In one aspect the invention provides an aircraft control surface failsafe hinge configuration comprising a drop link configuration which is adapted to attach a control surface to an aircraft structure, wherein the drop link additionally incorporates a failsafe hinge means which provides a backup hinge connection between the control surface and the aircraft structure to which it is attached.

Thus the construction according to various embodiments of the invention obviates the need for separate failsafe hinges mounted between the control surface and the corresponding part of the aircraft structure and permits the removal of the failsafe attachment hardware, thus allowing a significant weight saving to be achieved.

The drop link may include a failsafe hinge aperture located to engage, following the failure of a main hinge, with a corresponding failsafe hinge mount located on the aircraft control surface, via a failsafe hinge pin. Such a failure would normally result in the detachment of the control surface from the structure of the aircraft. This engagement allows continued operation of the control surface.

The drop link preferably includes two mount points at opposing distal ends of the drop link, with the failsafe hinge aperture located there between.

The control surface may be a spoiler, aileron, horizontal control surface, elevator or vertical tail plane.

Preferably, where the control surface is a spoiler, spoiler drop link mount points are attached to the spoiler and a corresponding wing structure in such a way that wing flex is transmitted to the spoiler.

In another aspect, the invention provides an aircraft wing or other aircraft structure incorporating an aircraft control surface failsafe hinge as hereinbefore defined.

In yet another aspect, the invention provides an aircraft control surface mount installation including a failsafe hinge as hereinbefore defined.

In another aspect, the invention provides for a drop link which includes two mount points located at opposing distal ends of the drop link, wherein the drop link preferably incorporates a failsafe hinge aperture located between the opposing distal ends.

BRIEF DESCRIPTION OF THE DRAWINGS

The present invention will now be described by way of example only, with reference to the drawings in which.

BEST MODE FOR CARRYING OUT THE INVENTION

The specific description, which follows, relates to a spoiler installation on a wing. However, as noted above, the invention may be applied to other control surface installations with appropriate modifications.

Figure 3:
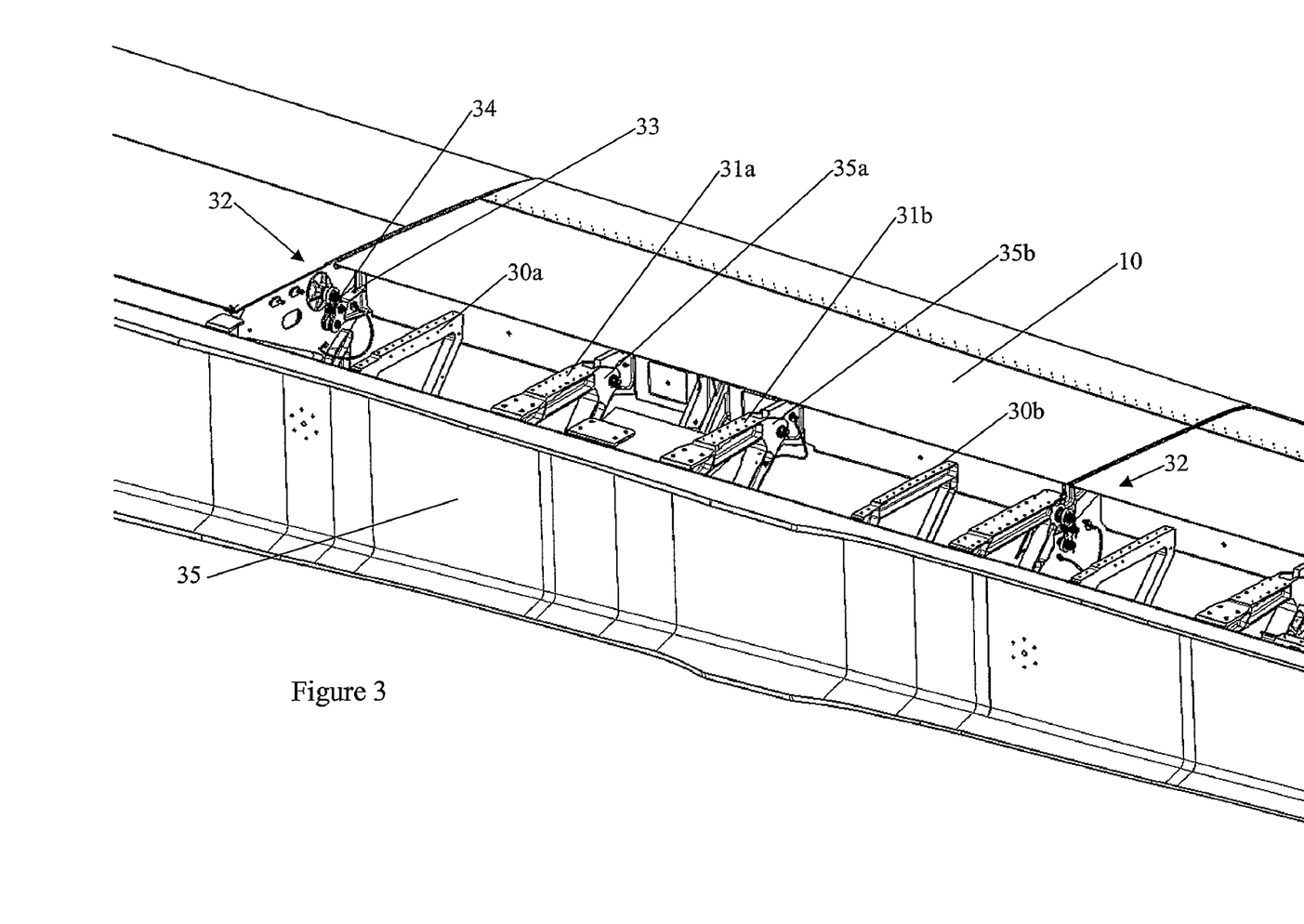
FIG. 3: illustrates a spoiler/wing hinge arrangement incorporating a failsafe hinge drop link in accordance with an embodiment of the invention.

FIG. 3 illustrates a spoiler failsafe hinge drop link construction and installation in accordance with an embodiment of the invention. Referring to FIG. 3, a spoiler 10 is attached to spoiler ribs 31*a* and 31*b* which are mounted on the trailing edge of a wing box, the rear spar of which is indicated by the numeral 35. Conventional spoiler extension/retraction is provided by means of primary hinges 35*a* and 35*b*. However, by comparison with the layout shown in FIG. 1, there are no spoiler failsafe hinges mounted on the spoilers adjacent the spoiler failsafe hinge ribs 30*a* and 30*b* (these ribs being shown to illustrate the conventional location of the failsafe hinges).

Figure 4:
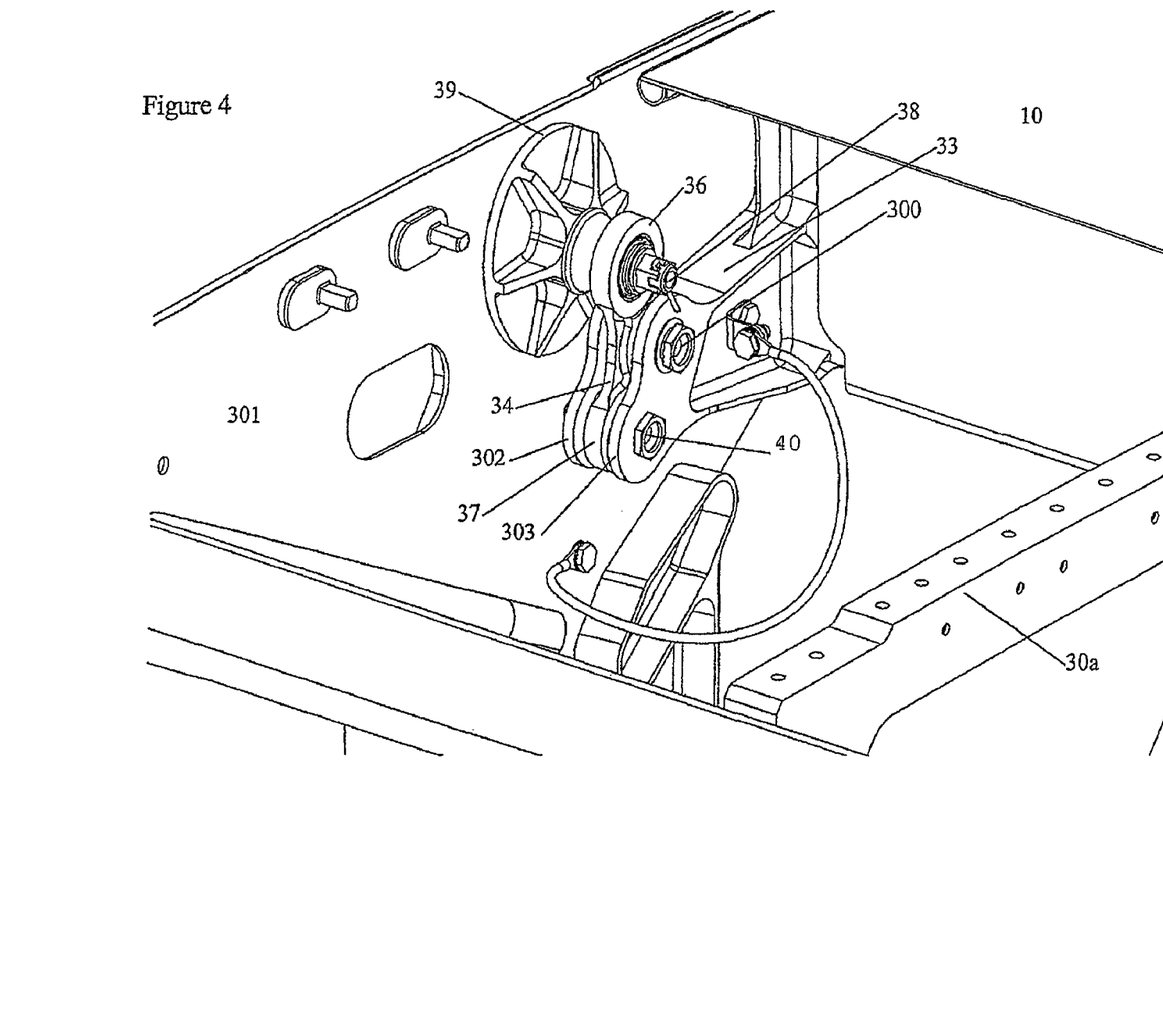
FIG. 4: illustrates detail of the failsafe hinge drop link configuration shown in FIG. 3.

Spoiler failsafe hinge drop link configurations 32 are located at the ends of the spoilers where they are connected to the wing structure 301 by means of a spoiler clevis 33 and spoiler clevis pin 40 (see FIG. 4).

The failsafe functionality of the drop link configuration 32 is described in more detail with reference to FIG. 4 as follows. A spoiler 10 is connected to a wing structure 301, in this example the inner fixed shroud end rib, by means of a clevis 33 having tabs 302 and 303, a drop link 34 and a drop link mounting plate 39. The upper part 36 of the drop link 34 is connected to the wing structure 301 by means of a spigot pin 38 and plate 39 and the lower end 37 of the drop link 34 is connected to the spoiler 10 by way of the spoiler clevis 33 and spoiler clevis pin 40.

In normal operation, the drop link 34 functions in a conventional manner with flexing forces being transmitted into the spoiler depending on the degree of spoiler extension.

According to one embodiment of the invention, the drop link 34 incorporates failsafe hinge functionality as follows. Referring to FIG. 4, the drop link 34 includes upper and lower parts 36 and 37, which are connected to a corresponding spoiler clevis 33 and wing structure 301 respectively by means of spherical bearings. These function in a conventional way transmitting flexing forces to the spoiler 10. The spoiler 10 hinges about the axis of the spigot pin 38. This rotational axis is coincident with the hinge axis of the primary spoiler hinges 35a and 35b. Thus, as the spoiler extends and retracts, the spoiler/clevis assembly 10/33 shown in FIG. 4 rotates around the spigot pin 38.

The drop link configuration 32 additionally comprises a failsafe hinge. This is constructed by means of a failsafe drop link pin 300, the spoiler clevis 33 and a drop link 34 aperture 61 (see FIG. 5) through which the failsafe drop link pin 300 passes. The diameter of the drop link aperture 61 is greater than the outside diameter of the spoiler failsafe drop link pin 300. Therefore, in normal operation, and in a similar manner to a conventional failsafe hinge, the failsafe pin 300 does not engage with the inner surface of the hinge aperture 61 as the spoiler 10 extends and retracts.

Figure 5:
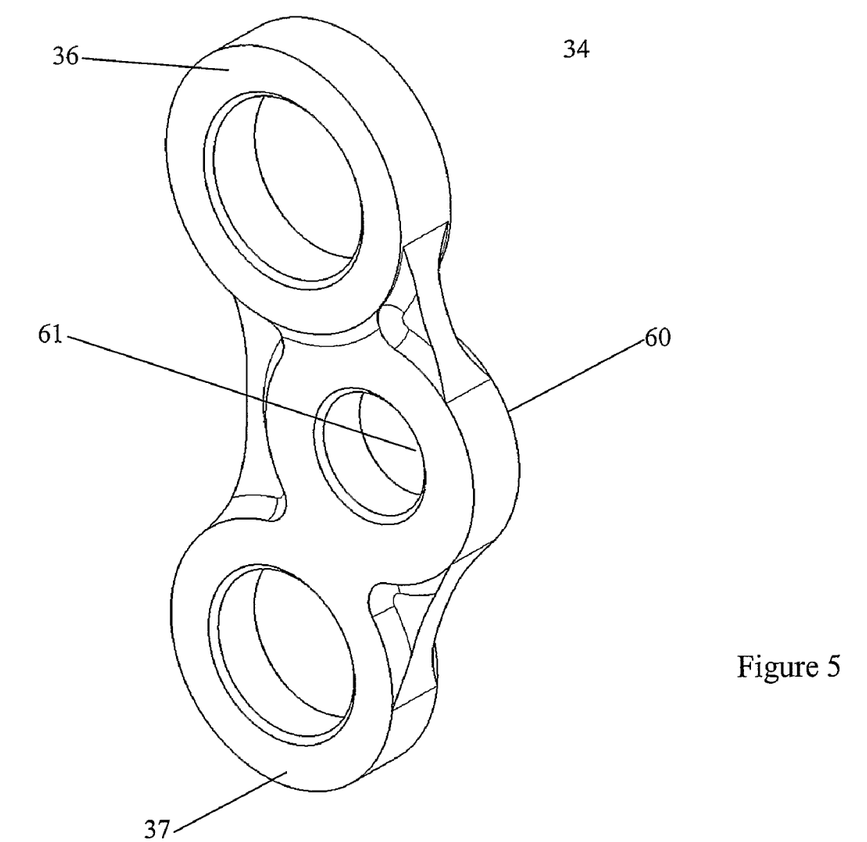
FIG. 5: illustrates a drop link in accordance with an embodiment of the invention.

Detail of an embodiment of a failsafe drop link 34 is shown in FIG. 5. Here, the drop link shaft 60 is utilized in a novel manner by incorporating an aperture 61 which, together with the failsafe drop link pin 300 and spoiler clevis 33, forms a spoiler failsafe hinge. In cross section, this subassembly of the novel drop link failsafe hinge is similar to the hinge part shown in cross-section in FIG. 8. In normal operation of the spoiler, the failsafe drop link pin 300 does not engage with the inner surface of the aperture 61. Thus in this configuration, the failsafe drop link pin 300 is surrounded by an annular void (not visible in FIG. 4).

However, if a catastrophic failure of a primary spoiler hinge occurs such that spoiler detachment is imminent, the spoiler remains secured to the wing structure by means of the drop link pin 300 bearing against the inner surface of the drop link aperture 61. This prevents complete spoiler detachment and therefore provides the required safety margin. Continued spoiler function is affected by means of the drop link failsafe hinge configuration.

In other embodiments, the specific geometry of the failsafe spoiler drop link may be varied to suit the specific installation requirements. For example, the relationship between the drop link apertures may be linear or displaced (as shown in the particular embodiment illustrated in FIG. 5).

Thus, the invention allows the complete removal of the prior art redundant failsafe hinge assembly from the wing thereby providing significant weight savings. In a similar manner, and as noted above, other aerodynamic control surfaces may be modified in accordance with embodiments of the invention.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. An aircraft control surface failsafe hinge configuration, comprising: a controllable control surface; and a drop link configuration adapted to attach the controllable control surface to an aircraft structure, wherein the drop link additionally incorporates a failsafe hinge mechanism which provides a backup hinge connection between the controllable control surface and the aircraft structure to which the controllable control surface is attached.

2. An aircraft control surface failsafe hinge configuration as claimed in claim 1 wherein the drop link includes a failsafe hinge aperture located to engage, following the failure of a main hinge, with a corresponding failsafe hinge mount located on the aircraft controllable control surface via a failsafe hinge pin.

3. An aircraft control surface failsafe hinge configuration as claimed in claim 2 wherein, the drop link includes two mount points at opposing distal ends of the drop link, with the failsafe hinge aperture located there between.

4. An aircraft control surface failsafe hinge configuration as claimed in claim 3 wherein the diameter of the failsafe hinge aperture is larger than the outer diameter of the failsafe hinge pin.

5. An aircraft control surface failsafe hinge configuration as claimed in claim 1 wherein the controllable control surface corresponds to a spoiler, aileron, horizontal control surface, elevator or vertical tail plane.

6. An aircraft control surface failsafe hinge configuration as claimed in claim 1 wherein the controllable control surface corresponds to a spoiler.

7. An aircraft control surface failsafe hinge configuration as claimed in claim 6 wherein the spoiler drop link mount points are attached to the spoiler and a corresponding wing structure in such a way that wing flex is transmitted to the spoiler.

8. An aircraft control surface failsafe hinge configuration as claimed in claim 7 wherein, spoiler drop link mount points are attached to the spoiler using spherical bearings.

9. An aircraft structure incorporating an aircraft control surface failsafe hinge configuration as claimed in claim 1.

10. An aircraft control surface mount installation including a failsafe hinge configuration as claimed in claim 1.

11. An aircraft control surface failsafe configuration as claimed in claim 1, wherein the drop link includes two mount points located at opposing distal ends of the drop link, and wherein the drop link incorporates a failsafe hinge aperture located between the opposing distal ends.

12. An aircraft control surface failsafe hinge configuration as claimed in claim 11 wherein the failsafe hinge aperture is offset from a line joining the two mount points.

\* \* \* \* \*